April 14, 1942. C. E. HATHORN 2,279,887
ADJUSTABLE MOUNTING FOR ROTATABLE MEMBERS
Filed Nov. 2, 1938
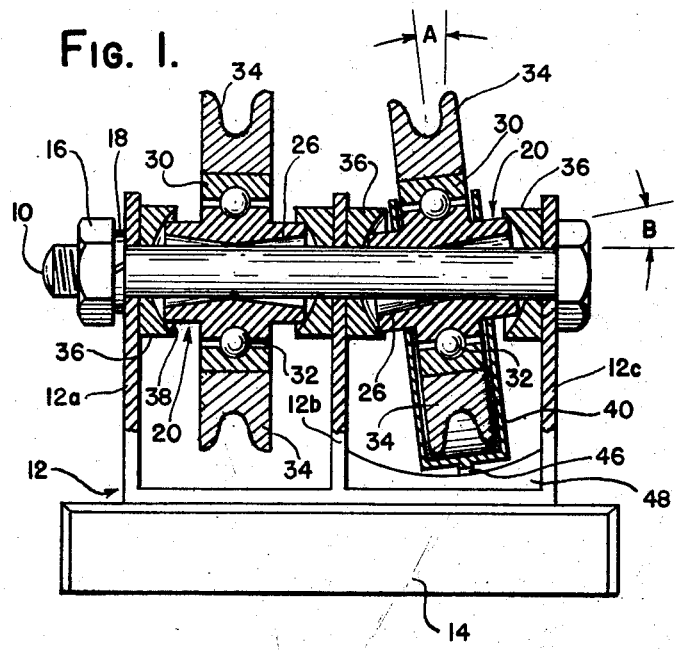
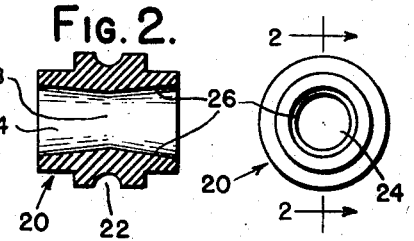
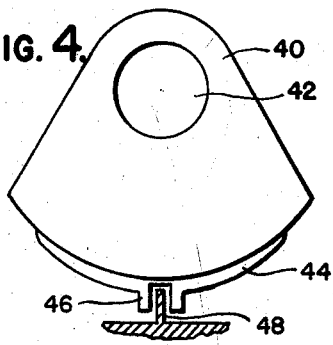
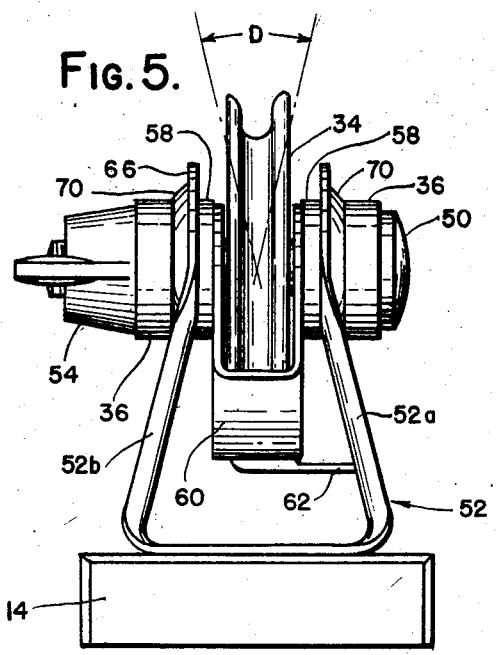
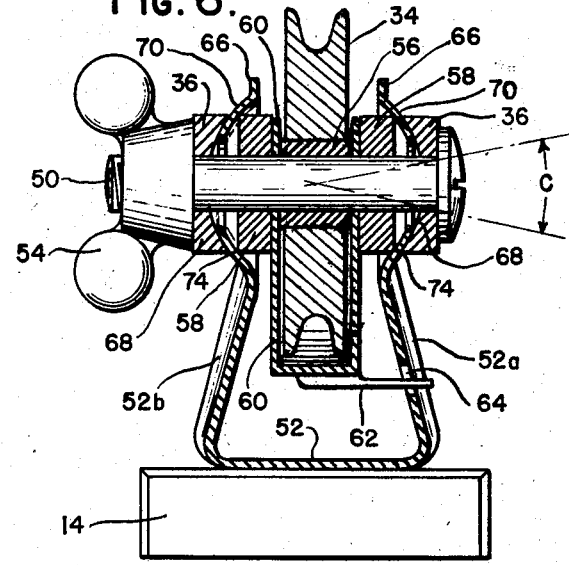
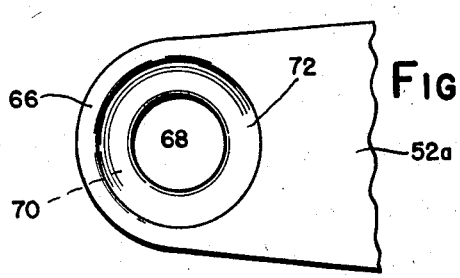
INVENTOR.
CHARLES E. HATHORN.
BY
ATTORNEY.

Patented Apr. 14, 1942

2,279,887

UNITED STATES PATENT OFFICE 2,279,887

ADJUSTABLE MOUNTING FOR ROTATABLE MEMBERS

Charles E. Hathorn, Kenmore, N. Y., assignor to Curtiss-Wright Corporation, a corporation of Delaware Application November 2, 1938, Serial No. 238,335

9 Claims. (Cl. 254—190)

This invention relates to pulleys and more specifically to pulleys adjustably mounted for setting within limited angles.

Previously in the fixed mounting of pulleys or sheaves for control cables it has been difficult to mount the pulleys so as to insure a perfect alignment between the rotational axis of the pulley and the plane passing through the cable runs. Such misalignment, even though slight, invariably resulted in the cable chafing on the pulley flanges and caused undue wear of the contact parts and the only remedy was to remove and reset the mounting, or else replace it completely. Obviously, such a procedure is extremely unsatisfactory as it imposes delay with additional labor and expense, and because of this abrasive action there is always the constant danger of cable failure attendant during the life of the installation.

It is, therefore, a primary object of this invention to provide an adjustable pulley that once installed can be quickly and easily set to the most favorable angular adjustment and then tightened into its final position, which attitude may be retained until such time as a change in conditions, such as wear of the parts, may require a new adjustment.

Another object of this invention is to provide a gang mount for two or more pulleys in which each pulley can be individually adjusted to the optimum angle dictated by the particular circumstances surrounding the installation. A further object is to provide such a gang mounting of simple and compact construction while yet a further object is to provide an adjustable pulley in which adjustment can be immediately made by hand without the use of special tools.

Other objects and advantages will become apparent during the course of the following description and from a consideration of the accompanying drawing in which:

Figure 1 is a view partly in section showing a gang mounting of two pulleys;

Figure 2 is a cross-sectional view of a pulley hub taken on the line 2—2 of Figure 3;

Figure 3 is an end elevation of the hub shown in Figure 2;

Figure 4 is an end elevation of a cable guard showing means to prevent its rotation;

Figure 5 is a front elevation of a modified pulley mounting;

Figure 6 is a cross-sectional view of the assembly shown in Figure 5; and,

Figure 7 is a fragmentary showing of one tip of the pulley mount shown in Figures 5 and 6.

In the drawing and with particular reference to Figures 1 to 4, inclusive, the numeral 10 indicates a bolt serving as the shaft upon which one or more adjustable pulleys may be mounted for rotation. As previously stated, one of the objects of the invention is to provide a mounting for one or a plurality of adjustable pulleys and in the specific illustration of Figure 1 the mounting is such as to provide for two pulleys mounted co-axially upon the bolt 10 in spaced relation to each other and to the mounting base 14. This bolt which may be supported in any suitable form of bracket 12, as illustrated, comprises a member cut or stamped from a piece of strap metal. In this particular instance, the bracket is bent into a U-shape and provided at its mid-point with a welded partition mounted at right-angles to the base and disposed equi-distant to the arms 12a and 12c of the member 12. This member is designated as 12b and in its relationship to the remainder of the bracket it forms the middle arm of an E-shaped bracket. If more than two pulleys are desired in the mount it is necessary to correspondingly lengthen the strap 12 and provide an additional member 12b for each additional pulley. However, apertures having coincident axes are drilled through the arms 12a to 12c, inclusive, and upon assembly bolt 10 is passed therethrough, a lock-washer 18 is slipped over its end and a nut 16 is placed thereupon.

The mounting for each individual pulley comprises a hub 20, which is best shown in Figures 2 and 3. This comprises a generally cylindrical member formed circumferentially at its mid-point with a ball-race 22 and having a doubly tapered bore 24 extending longitudinally therethrough. The bore 24 tapers from each end as at 26 toward the mid-circumferential ring 28 where its diameter is a minimum. The purpose of this construction is to provide a degree of angular adjustment between the hub 20 and the bolt 10 when the two are in assembled relationship.

To cooperate with the ball-race 22, an annular member 30 is provided having a semi-spherical indentation which is disposed opposite the similar indentation of the race 22 when these parts 20 and 30 are assembled in co-axial relationship. Following this assembly balls 32 are inserted in the races by well known means, to the end that a complete ball-bearing is formed. Upon this assembly is next slipped a pulley 34 of any suitable composition and the fit between the pulley and the member 30 is tight enough to prevent separation of the two under ordinary circumstances. When the complete pulley has been assembled on shaft 10 between two of the arms 12a, 12b or 12c, washers 36 are disposed on either side thereof and these have concave spherical faces 38 disposed so as to contact the ends of the hub 20. The dimensions of the hub plus the thickness of two washers 36 are so proportioned as to substantially fill the space between two of the arms 12a and 12b. If desired, the pulley may be provided with a cable guard such as 40 formed substantially as shown in connection with the right-hand pulley of Figure 1. The guard 40 is provided with co-axial apertures 42 in the side walls thereof which provide for mounting upon the hub 20 and this is accomplished by spreading the side walls so that the hub may be slipped therebetween. At the mid-point at the bottom of the guard is provided a fitting 44, suitably attached thereto and provided with a pair of fingers 46 extending radially outward therefrom and disposed in spaced relationship. Extending between the arms 12b and 12c is a thin strip of material 48 curved along one edge with a radius equal to its distance from the center of angular adjustment of the pulley 34 and this is designed to be straddled by the previously mentioned fingers 46 to prevent rotation of the guard 40 with respect to pulley 34. The fingers are so spaced that a slight play of the guard 40 with respect to the pulley 34 is possible in a rotational sense so that the angular adjustment of the latter may not be impeded.

With the mounting just described and specifically because of the tapered bore of hub 20, it is then possible to adjust the axis of rotation of the pulley with respect to the axis of bolt 10 through a limited angle and such an angle is indicated at A or B. However, the angles A and B show merely the maximum angular deviation from the axis of the bolt, when, as a matter of fact, the actual deviation of the pulley axis may be anywhere within a cone of revolution having an apex angle equivalent to 2A. Hence with the pulley axis set to the desired angle it is only necessary to tighten nut 16 to set the adjustment.

In Figures 5 to 7, inclusive, is shown a modified form of mounting adapted for a single pulley and comprising a bolt 50 serving the same purpose as the previously mentioned bolt 10. The bracket, in this case designated 52, is formed with two arms 52a and 52b through which the bolt extends. The pulley 34 is mounted upon a simple cylindrical hub 56 and is provided with a cable guard 60 which is prevented from relative rotation by means of an extending finger 62 which passes through a slot 64, of limited dimensions, formed in the arm 52a. Disposed upon either side of the cable guard 60 is a pair of cylindrical washers 58 of great relative thickness and the overall dimension of this assembly is such as to just fill the space between the two arms 52a and 52b. The tips of each of these arms, as at 66, are pierced with co-axial apertures 68, of greater diameter than the bolt 50 which is passed therethrough. Also the metal surrounding the apertures is dished into a part-spherical shape in which the inner concave face is designated 72 while the outer face is designated 70. Disposed upon the bolt 50 adjacent the said outer faces 70 are part-spherical washers 36 and completing the assembly is a wing nut 54. Prior to tightening of this nut 54 the pulley axis may be adjusted within a conoidal angle substantially as indicated at C. Such adjustment will cause an angular adjustment of the pulley's plane of rotation as indicated at D which is of the same magnitude as C.

This adjustment is accomplished by reason of the difference in diameters of the bolt 50 and the apertures 68 in the arms 52a and 52b and by reason of the fact that relative movement between the washers 36 and 58 and the spherical faces 70 and 72 is possible. However, upon tightening of the wing nut 54 the sharp edges of the washer 58 bite into the inner concave faces 72 as is shown at 74 and prevent any loosening or change in the angular disposition of the pulley.

From the preceding description it may be seen that the pulley mount and assemblage comprises relatively few parts, each inexpensive to manufacture and that it is relatively easy of adjustment, which adjustment may be made from time to time without any disassembly of the parts.

It is to be understood that the preferred form of my invention, herewith shown and described, may be varied in respect to its size, shape and relative arrangement without in any way departing from the spirit of my invention.

What I claim is:

1. In an adjustable pulley mounting, a bifurcated support member provided with tandem apertures, a pulley wheel, washers disposed on either side of said pulley, a spindle passing through said support member, washers, and pulley, means comprising the hub of said pulley adapted for adjusting the axis of rotation of said pulley with respect to said spindle and means cooperating with said spindle adapted to tend to force the said washers toward each other whereby the said pulley will be maintained in adjusted angular attitude therebetween.

2. In an adjustably mounted pulley the combination of; a pair of spaced support arms; a spindle sustained by said support arms; a pulley hub, mounted on said spindle, comprising an angularly adjustable non-rotatable first part and a second part mounted to rotate in a plane fixed with respect to the longitudinal axis of said first part, the said second part being adapted to function as a pulley wheel; and lock means for compressing said support arms to cause said first part to be gripped in an angularly adjusted position therebetween.

3. In an adjustable pulley mounting, a bifurcated support member, a pulley spindle carried by said support member, a pulley wheel hub having a doubly tapered bore providing for adjustment of its longitudinal axis with respect to said spindle, a pulley wheel rotatably mounted on said hub and means to cause said bifurcated support member to grip the said hub member in adjusted angular relationship.

4. In an adjustable pulley mounting, a bifurcated support bracket, a spindle carried thereby, a pulley hub having a doubly tapered bore extending therethrough to accommodate said spindle, a pair of concave-face washers mounted on said spindle in opposed relationship in contact with said pulley hub and said support member, a pulley rotatably carried by said hub and means to establish contact pressure between said washers, hub and bracket whereby said pulley may be fixed in adjusted position with respect to said support bracket.

5. In an adjustable pulley mounting, a non-rotatable substantially cylindrical hub, a pulley wheel carried thereby, friction reducing means rotatably joining said wheel to said hub, mounting means for said hub, including part spherical gripping surfaces adapted to grip the opposed ends of said hub and means adapted to compress said mounting means to force the gripping surfaces into engagement with said hub to thereby releasably fix the axis of rotation of said pulley wheel in a selected angular relationship with respect to said mounting means.

6. In an adjustable pulley mounting, a support bracket, a substantially cylindrical hub formed with a doubly tapered bore, a pair of concave washers mounted in opposed relation to embrace the ends of said cylindrical hub, a pulley rotatably carried by said hub and means extending through said bracket, tapered bore and washers adapted to compress the same to cause the ends of said hub to bite into the concave surfaces of said washers to maintain an adjusted relationship of the axis of said pulley.

7. In a mounting for a plurality of adjustable pulleys, a mounting bracket including a plurality of protruding arms, a spindle supported by said arms, a pair of spaced washers mounted on said spindle between each pair of said arms, each said washer having a concave face, a pulley hub adapted for variable mounting between each pair of washers in contact with the concave faces thereof to be angularly adjustable with respect thereto, and means operating on said spindle and bracket to fix the angular adjustment of each pulley hub with respect to said bracket.

8. In an adjustably mounted pulley, the combination of a support including a pair of spaced arms, a pulley assembly adjustably mounted between said arms comprising a lockable tubular hub portion having ends frictionally abutting the opposed faces of said arms and a rotatable pulley portion mounted upon said hub portion to rotate in a plane fixed with respect to the longitudinal axis thereof, and lock means including an elongated element adapted to compress said support arms to cause said hub portion to be gripped in an angularly adjusted position therebetween.

9. In an adjustably mounted pulley, the combination of a support including a pair of spaced arms, a pulley assembly adjustably mounted between said arms comprising a non-rotatable hollow hub portion and a rotatable pulley portion mounted upon said hub portion to rotate in a plane fixed with respect to the longitudinal axis thereof the said hub portion extending between the opposed faces of said arms, lock means including an elongated tensioning element for drawing said support arms together to cause said hub portion to be gripped in any of a plurality of angularly adjusted positions therebetween, a cable guard supported from said pulley assembly adapted to embrace the same and means associated with said support adapted to permit adjustment of said guard with said pulley assembly and to prevent rotation of said guard about the axis of said hub portion.

CHARLES E. HATHORN.